(12) United States Patent
Gandhi

(10) Patent No.: US 9,580,907 B2
(45) Date of Patent: Feb. 28, 2017

(54) BI-STABLE MATERIAL TO DEVELOP STOWABLE HIGH STRENGTH COLUMN

(71) Applicant: Toyota Motor Engineering & Manufacturing North America, Inc., Erlanger, KY (US)

(72) Inventor: Umesh N. Gandhi, Farmington Hills, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 2 days.

(21) Appl. No.: 14/581,396

(22) Filed: Dec. 23, 2014

(65) Prior Publication Data

US 2016/0177567 A1    Jun. 23, 2016

(51) Int. Cl.
| | | |
|---|---|---|
| *E04B 1/34* | (2006.01) | |
| *E04C 3/00* | (2006.01) | |
| *E04H 12/18* | (2006.01) | |
| *B64G 1/22* | (2006.01) | |
| *B64G 99/00* | (2009.01) | |
| *B29C 53/20* | (2006.01) | |

(52) U.S. Cl.
CPC .............. *E04C 3/005* (2013.01); *B64G 1/22* (2013.01); *B64G 9/00* (2013.01); *E04H 12/18* (2013.01); *B29C 53/20* (2013.01)

(58) Field of Classification Search
CPC ........... E04C 3/005; E04H 12/18; B64G 9/00; B64G 1/22; B29C 53/02

USPC ...................................... 52/2.11, 108, 653.2
See application file for complete search history.

(56) References Cited

U.S. PATENT DOCUMENTS

| | | | | |
|---|---|---|---|---|
| 1,947,392 | A * | 2/1934 | Guntermann | B65H 75/44 135/114 |
| 2,352,526 | A * | 6/1944 | Farrand | A47B 13/00 52/108 |
| 2,840,199 | A * | 6/1958 | Quentery | H01Q 1/087 343/877 |
| 3,360,894 | A * | 1/1968 | Orr | E04C 3/005 138/166 |
| 3,434,254 | A * | 3/1969 | Rubin | B64G 9/00 138/119 |
| 3,503,164 | A * | 3/1970 | Medal | E04C 3/005 52/108 |

(Continued)

FOREIGN PATENT DOCUMENTS

| | | | | |
|---|---|---|---|---|
| DE | WO 2013107855 | A1 * | 7/2013 | ............. E04C 3/005 |
| GB | 2385077 | B | 12/2004 | |

(Continued)

*Primary Examiner* — Adriana Figueroa
(74) *Attorney, Agent, or Firm* — Christopher G. Darrow; Darrow Mustafa PC

(57) ABSTRACT

A stowable, load-bearing apparatus is disclosed having at least two bi-stable strips. Each of the bi-stable strips is alternatable between a stable, extended conformation having longitudinal linearity and lateral curvature and a coiled conformation having longitudinal curvature and lateral linearity. The two bi-stable strips are intercoiled when in the coiled conformation, have opposing lateral curvature relative to one another when in the extended conformation, and when extended are directed into a load-bearing alignment by a structural alignment member.

15 Claims, 4 Drawing Sheets

(56) References Cited

U.S. PATENT DOCUMENTS

| | | | | |
|---|---|---|---|---|
| 3,508,587 | A * | 4/1970 | Mauch | F16L 11/121 |
| | | | | 138/119 |
| 3,691,705 | A * | 9/1972 | Luckey | E04C 3/005 |
| | | | | 431/47 |
| 3,749,133 | A * | 7/1973 | Bochory | F16L 11/121 |
| | | | | 138/119 |
| 5,235,788 | A * | 8/1993 | Maimets | B64G 4/00 |
| | | | | 244/172.6 |
| 6,505,443 | B1 * | 1/2003 | Budescu | A61G 1/00 |
| | | | | 52/108 |
| 6,910,304 | B2 * | 6/2005 | Warren | B64G 1/222 |
| | | | | 52/108 |
| 7,598,651 | B2 * | 10/2009 | Kornbluh | B64C 3/48 |
| | | | | 310/309 |
| 8,302,696 | B2 * | 11/2012 | Williams | E21B 41/00 |
| | | | | 166/207 |
| 8,632,454 | B2 | 1/2014 | Lashinski et al. | |
| 8,776,451 | B2 | 7/2014 | Watanabe et al. | |
| 2014/0230949 | A1 * | 8/2014 | Daton-Lovett | B64G 1/222 |
| | | | | 138/177 |

FOREIGN PATENT DOCUMENTS

| | | | | |
|---|---|---|---|---|
| GB | 2445572 | A * | 1/2007 | F16F 1/02 |
| WO | 9962811 | A1 | 12/1999 | |

* cited by examiner

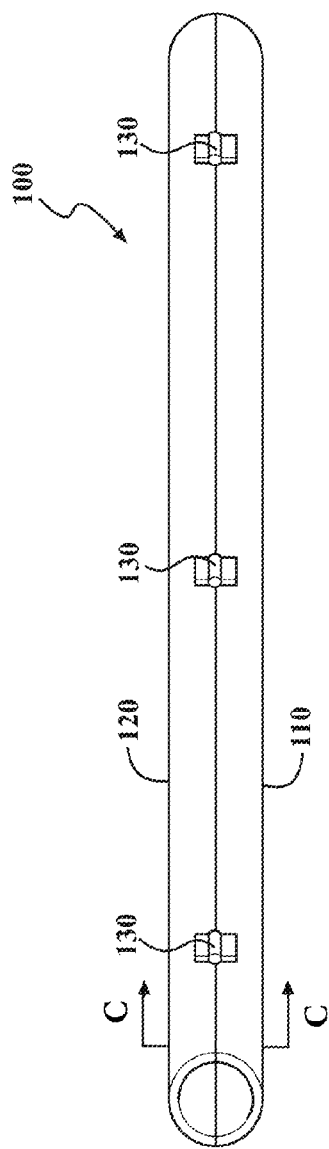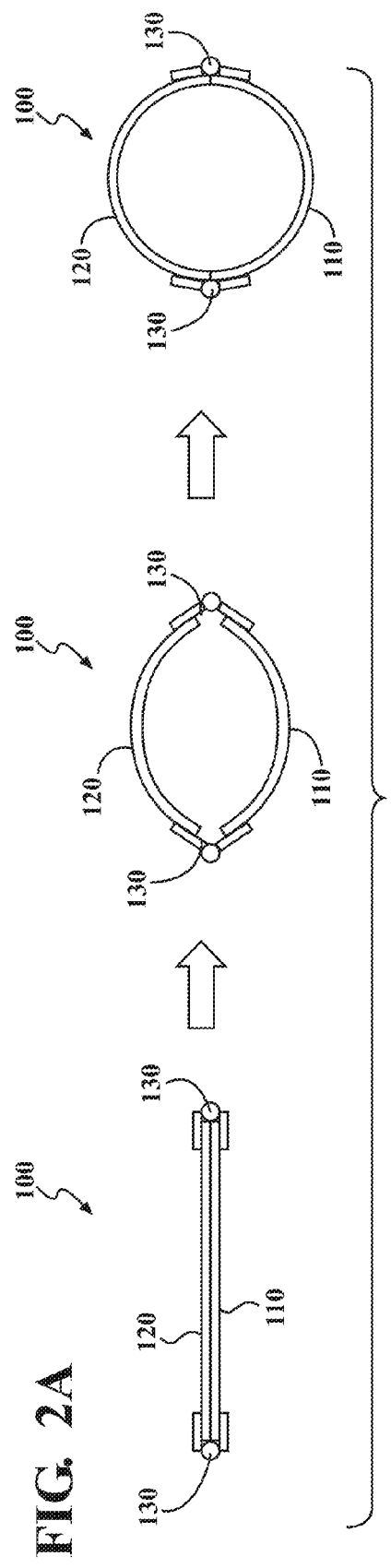

BI-STABLE MATERIAL TO DEVELOP STOWABLE HIGH STRENGTH COLUMN

TECHNICAL FIELD

The present disclosure relates to a high-strength, extended support column which is collapsible for convenient storage.

BACKGROUND

Bi-stable materials, and structures or devices derived therefrom, can be present in either of two stable conformations, but are structurally instable any other conformations. In an example, bi-stable strips which are deployable in either a coiled conformation having longitudinal curvature and lateral linearity, or an extended conformation having longitudinal linearity and lateral curvature, are known in the art.

Structural support members based on bi-stable materials utilize this property to enable convenient reversibility between a retracted, stowable form and an extended, column-like, load-bearing form. The design of such structures however typically leads to formation in the extended form of a column which is either incomplete, having a gap, or otherwise not cross-sectionally affixed. This in turn leads to less than optimal load bearing strength.

SUMMARY

A stowable support apparatus, reversibly configurable in a stowable conformation and a column-like conformation, is disclosed. The stowable support apparatus includes a first bi-stable member, a second bi-stable member, and at least one structural alignment member. Each of the first bi-stable member and the second bi-stable member is alternatable between a stable, extended conformation having longitudinal linearity and lateral curvature, and a stable, coiled conformation having longitudinal curvature and lateral linearity. The structural alignment member is configured to direct the stowable support apparatus into a load bearing conformation when the first and second bi-stable members are present in the extended conformation. The first and second bi-stable members can have an opposing lateral curvature relationship relative to one another when in the extended conformation.

In another implementation, a method for making a stowable support apparatus is disclosed. The method includes a step of providing a first bi-stable member and another step of providing a second bi-stable member. The first and second bi-stable members are alternatable between a stable, extended conformation having longitudinal linearity and lateral curvature, and a stable, coiled conformation having longitudinal curvature and lateral linearity. The method additionally includes a step of joining the first and second bi-stable members with at least one structural alignment member. The structural alignment member is configured to direct the stowable support apparatus into a load bearing conformation when the first and second bi-stable members are present in the extended conformation.

BRIEF DESCRIPTION OF THE DRAWINGS

FIG. 1C is a perspective view of the stowable support apparatus of FIG. 1A with the first and second bi-stable materials present in a fully extended conformation;

FIG. 2A is a series of cross sectional views of the apparatus of FIG. 1A-1C viewed along lines A, B, and C;

DETAILED DESCRIPTION

Figure 1A:
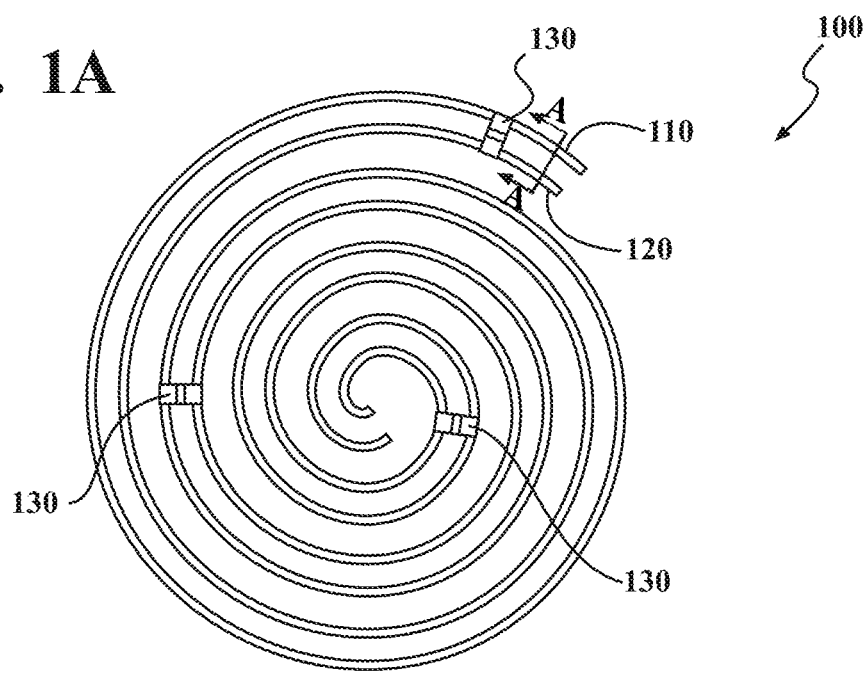
FIG. 1A is side cross-sectional view of a stowable support apparatus including first and second bi-stable materials, the first and second bi-stable materials present in a coiled conformation.

The present disclosure provides variations of a reversibly retractable/extendible support apparatus. The disclosed stowable support apparatuses are conformationally stable in either a retracted or stowable state, which is useful for storage, transport, or the like, or in an extended or deployed state which is useful for supporting a load. In general, when in the deployed state, the apparatus resembles a column-like structure amenable to a wide variety of uses. The unique design features of the apparatus confer superior load-bearing performance in comparison to competing structures.

Apparatuses of the present disclosure include at least two bi-stable strips. Each bi-stable strip is easily and reversibly transformable between an extended conformation and a coiled conformation. Further, each bi-stable strip is affixed to another bi-stable strip by one or more fastening members. As will be more clearly illustrated below, this combination of features allows the apparatus, when deployed, to form a fully-enclosed column in contrast to a single bi-stable strip apparatus which forms an open column.

With reference to FIGS. 1A-2C, a stowable support apparatus 100 may include a first bi-stable member 110, a second bi-stable member 120, and at least one structural alignment member 130. The first and second bi-stable members 110, 120 are configured to alternate between a compact form suitable for storage, and an extended form suitable for load support when the first and second bi-stable members 110, 120 are properly aligned. The at least one structural alignment member 130 is configured to maintain the first and second bi-stable members 110, 120 in contact or close proximity with one another, and to guide the first and second bi-stable members into proper alignment relative to one another for load support upon extension.

Each of the first and second bi-stable members 110, 120 (referred to collectively as "the bi-stable members 110, 120") comprises a bi-stable strip having a longitudinal axis and a lateral axis. Each of the bi-stable members 110, 120 is characterized by at least semi-rigid structural stability in either of a coiled conformation and an extended conformation, and relative structural instability in other conformations. Thus, each of the bi-stable members 110, 120 can be relatively easily transformed, with a proper application of pressure, from the coiled conformation to the extended conformation, and vice-versa.

The coiled conformation of the bi-stable members 110, 120 is characterized by a linear lateral axis and a curved longitudinal axis. Conversely, the extended conformation of the bi-stable members 110, 120 is characterized by a linear longitudinal axis and a curved lateral axis. In many variations, the coiled conformation of the first bi-stable member 110 and the coiled conformation of the second bi-stable member 120 will be substantially identical to one another. However, the extended conformation of the first bi-stable member 110 and the extended conformation of the second bi-stable member 120 will typically be different, having opposite curvature, as discussed in greater detail below.

Referring now to FIG. 1A, an example of the apparatus 100 is shown in a coiled conformation, i.e. with both the first bi-stable member 110 and the second bi-stable member 120 present in the coiled conformation. It is to be noted that the first and second bi-stable members 110, 120, when in the coiled conformation, are intercoiled or coiled around one another. For clarity only, the first and second bi-stable members 110, 120 are shown relatively loosely coiled and substantially spaced apart. More typically in actual practice, the first and second bi-stable members 110, 120 would be more tightly intercoiled.

Figure 1B:
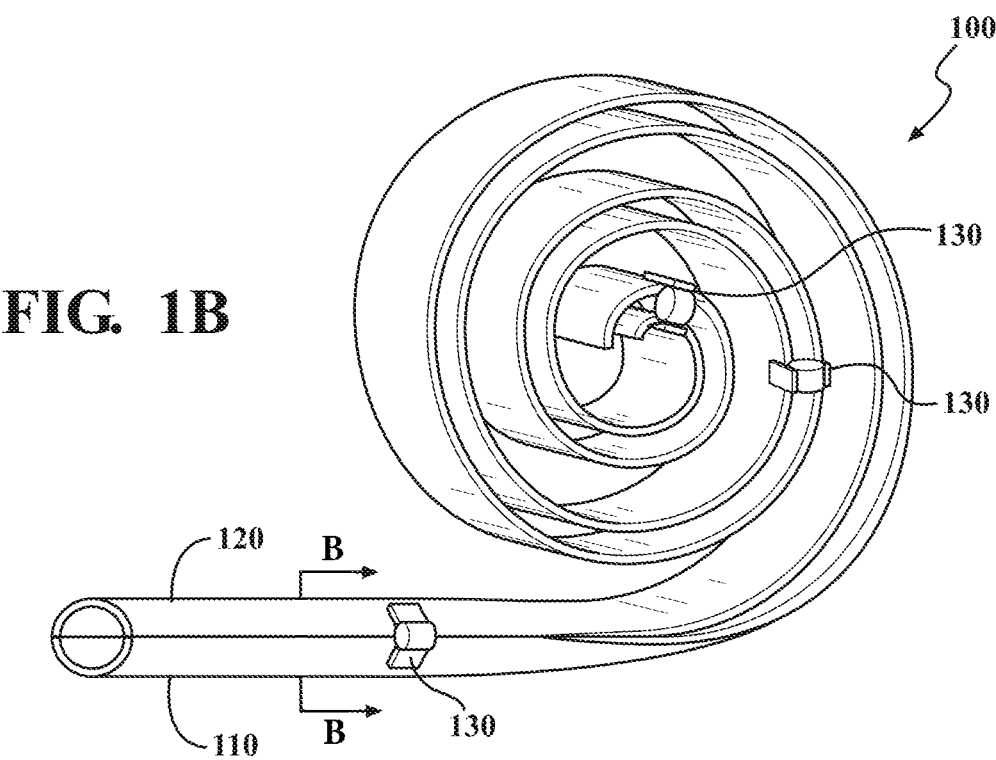
FIG. 1B is a perspective view of the stowable support apparatus of FIG. 1A with the first and second bi-stable materials present in a partially extended conformation.

The structural alignment member 130 of FIG. 1A comprises a plurality of flexible fasteners, in this instance a plurality of hinged fasteners, each affixed to adjacent lateral edges of the first and second bi-stable members. FIGS. 1B and 1C show the apparatus of FIG. 1A partially and completely transformed, respectively, from the coiled conformation to the extended conformation. It can be seen that the hinge portion of each of the plurality of flexible fasteners provides flexibility which allows each of the hinged, dual ended fasteners to maintain contact with the first and second bi-stable members when in either the coiled conformation or the extended conformation. In addition, the plurality of flexible fasteners direct the first and second bi-stable members 110, 120 into the desired structural alignment upon elongation, forming a laterally enclosed tube as shown in FIG. 1C.

FIG. 2A shows a series of cross-sectional views of the apparatus of FIGS. 1A-C, highlighting the lateral curvature, or lack thereof, of the first and second bi-stable members 110, 120 when in the coiled form (left), an intermediate form (middle), and the extend formed (right). The three cross-sectional views of FIG. 2A are viewed along the lines A-A, B-B and C-C of FIGS. 1A-C, respectively. The cross-sectional views of FIG. 2A further illustrate how the structural alignment member 130 directs the first and second bi-stable members 110, 120 into an alignment suitable to support a load as the apparatus 100 transitions from a coiled form to an extended form.

While the apparatus 100 of FIGS. 1A-1C has a plurality of hinged fasteners, any other suitable flexible fastener can be used. For example, suitable structural alignment members 130 of the flexible fastener type can include multiple flaps formed of flexible material and affixed to adjacent lateral edges of the first and second bi-stable members 110, 120. Such flexible material can include a flexible fabric, flexible membrane, or any other flexible material. In other instances, the structural alignment member 130 can comprise a single flexible fastener affixed to adjacent lateral edges of the first and second bi-stable members 110, 120, along the entirety or a substantial portion of the length of the adjacent lateral edges. In yet other instances, the structural alignment member 130 can include one or more flexible fasteners that are integrally formed with either or both of the first and second bi-stable members, rather than being affixed thereto.

In general, the first and second bi-stable members 110, 120 will have opposing lateral curvature relationship when in the extended conformation, relative to their longitudinal curvature when in the coiled conformation. Referring again to the example of FIG. 1B, the extended portion of the first bi-stable member 110 has a concave surface facing in the direction of the coiled portion and a convex surface facing away from the direction of the coiled portion. This can be termed a "positive curvature relationship", and materials having this property are known in the art. In contrast, the extended portion of the second bi-stable member 120 has a convex surface facing in the direction of the coiled portion and a concave surface facing away from the direction of the coiled portion. This can be referred to as a "negative curvature relationship". While the particular opposing lateral curvature relationship between the first and second bi-stable members 110, 120 of FIG. 1A results in a cylindrical structure with concave surfaces facing one another in the example of FIG. 1B, it is to be understood that the lateral curvature of each of the first and second bi-stable members 110, 120 can be reversed so that convex surfaces face one another when the stowable support apparatus 100 is deployed.

Methods for fabricating the bi-stable member 110 or 120 having a positive curvature relationship typically involve fabrication of a bi-layered or multi-layered, composite material having a positive Poisson ratio such that extension in the longitudinal direction results in retraction in the lateral direction, and vice-versa. This positive Poisson ratio results in the positive curvature relationship of the first bi-stable member of FIGS. 1B, 1C. The second bi-stable member having a negative lateral curvature relationship can be similarly designed of bi-layered or multi-layered, composite materials, at least one of which comprises an auxetic material having a negative Poisson ratio wherein extension in the longitudinal direction leads to expansion in the lateral direction, and vice-versa. This negative Poisson ratio results in the negative lateral curvature relationship of the second bi-stable member 120 in the example of FIGS. 1B, 1C. A non-limiting example of such an auxetic material includes a composite material wherein structural fibers form a periodic, inverted polygonal cell structure.

Figure 2B:
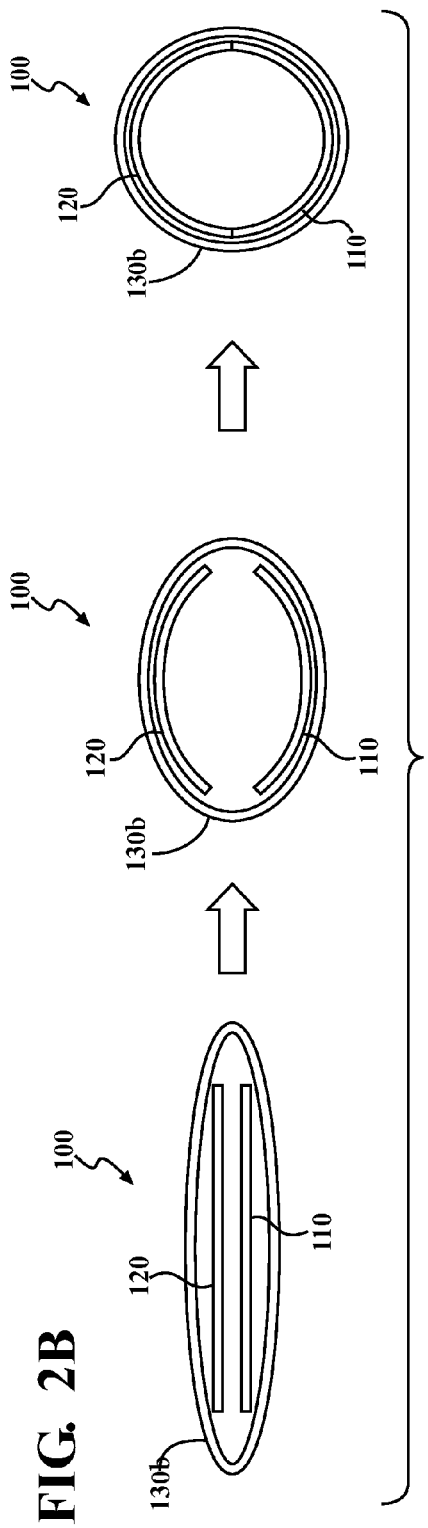
FIG. 2B is a series of cross sectional views of an apparatus of the type shown in FIG. 1A modified to have an encapsulating structural alignment member, and viewed along lines analogous to A, B, and C.
Figure 2C:
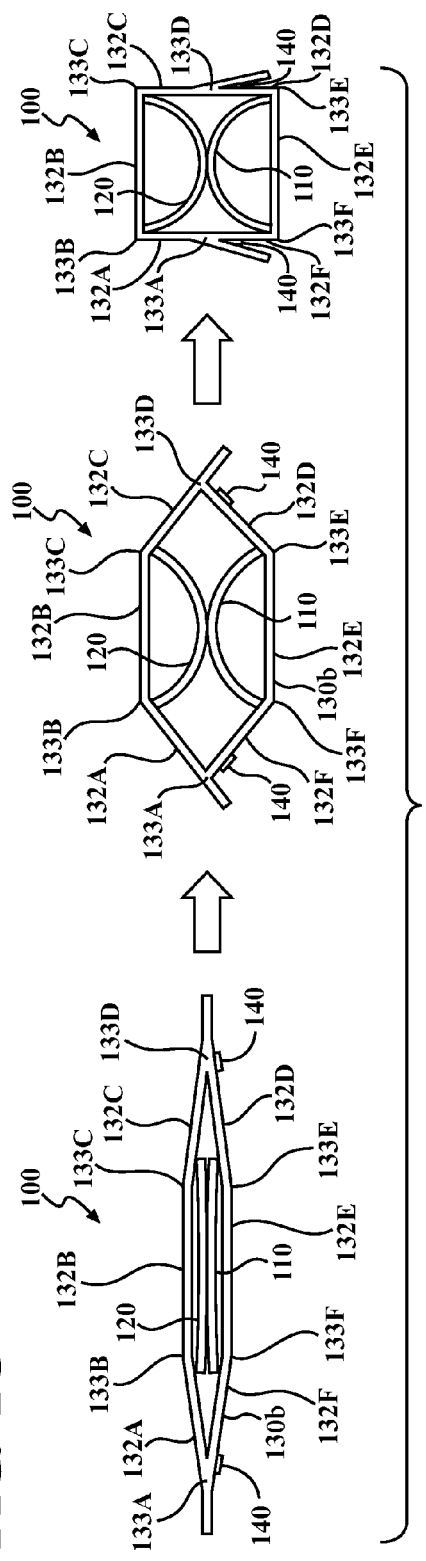
FIG. 2C is a series of cross sectional views of an apparatus of the type shown in FIG. 1A modified to have another type of encapsulating structural alignment member, and viewed along lines analogous to A, B, and C.

Referring now to FIGS. 2B and 2C, the structural alignment member 130 can alternatively be a flexible encapsulator 130*b* such as a carbon fiber or epoxy comprising membrane. The cross-sectional views of FIGS. 2B and 2C are of an apparatus 100 analogous to that of FIGS. 1A-1C, in which the flexible fastener type of structural alignment members 130 are replaced with a flexible encapsulator 130*b*, and the three views in each of FIGS. 2B and 2C are along similar lines to those of lines A-A, B-B and C-C of FIGS. 1A-1C. A flexible encapsulator 130*b* is a variety of structural alignment member which surrounds or encapsulates at least a portion of the first and second bi-stable members 110, 120. A flexible encapsulator 130*b* can be a membrane, fabric, or other flexible material having a sock-like or sleeve-like shape. In some variations, a flexible encapsulator 130*b* type of structural alignment member will be co-coiled with the first and second bi-stable members 110, 120 when the first and second bi-stable members 110, 120 are in the coiled conformation.

Referring again to FIG. 2B, the left panel shows the bi-stable members 110, 120 in the coiled conformation, in the right panel they are in the extended conformation, and in the middle panel they are in an intermediate state. As the apparatus 100 transitions from the stowed configuration to the deployed configuration, the flexible encapsulator 130*b* variety of structural alignment member 130 forces the first and second bi-stable members 110, 120 in to the tube shape that is the required alignment for maximum load bearing in this example. In this tube-like alignment, the cross-sectional view of the first and second bi-stable members 110, 120 appears as two 180° arcs held together at their end points to form a circle.

A similar scenario is depicted in FIG. 2C, however the lateral curvature relationships of the first and second bi-stable members 110, 120 when in the extended conformation are reversed. In this example, the flexible encapsulator 130*b* type of structural alignment member 130 is capable of adopting a shape with a square longitudinal edge section. Optionally in this example, the structural alignment member 130 is not uniformly flexible, but instead has rigid walls with longitudinal pivot lines. In this example, the structural alignment member has six rigid walls 132A, 132OB, 132C, 132D, 132E, and 132F and six longitudinal pivot lines 133A, 133B, 133C, 133D, 133E, and 133F (the longitudinal pivot lines 133A-133F appearing as pivot points in the end cross-sectional view of FIG. 2C) enabling the structural alignment member to alternate between a longitudinal edge section that is hexagonal when the apparatus 100 is stowed and a longitudinal edge section that is square when the apparatus 100 is deployed. Because of the reversed polarities of the curvature relationships of the first and second bi-stable members 110, 120 as well as the properties of the square flexible encapsulator 130*b*, the first and second bi-stable members are forced into a structure having a longitudinal edge cross sectional shape of two opposing arcs symmetrically conjoined at their midpoints. The apparatus 100 as a whole has the shape of a rectangular prism when deployed. The example of FIG. 2C also includes optional longitudinal flaps (appearing is lateral flaps in the end cross-sectional view of FIG. 2C) affixable with fasteners 140. When the longitudinal flaps are affixed to the fasteners 140 as in the right panel of FIG. 2C, this can help to maintain the apparatus 100 in the deployed configuration.

Figure 3:
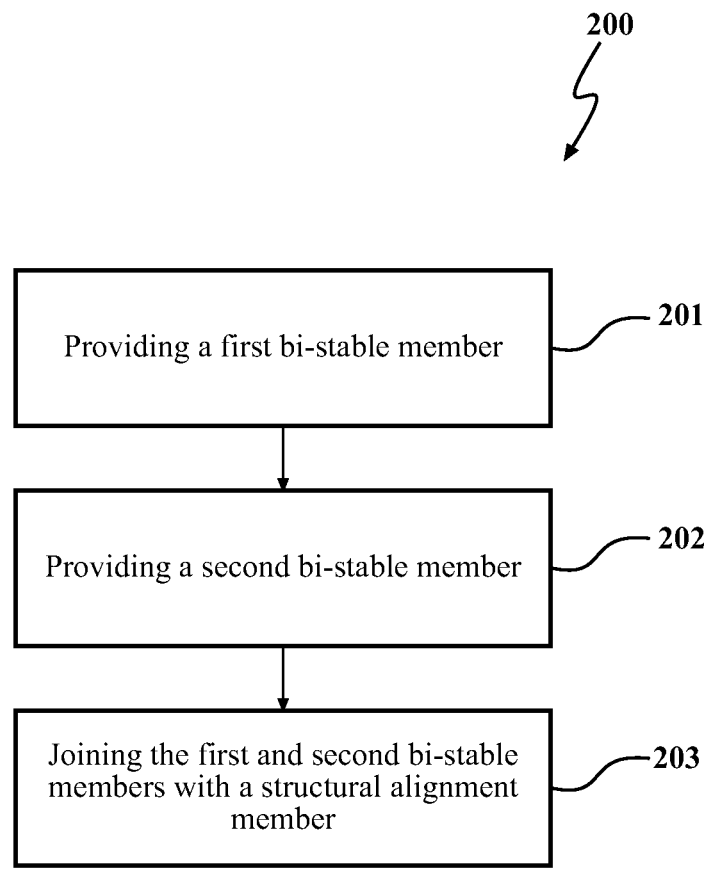
FIG. 3 is a flow diagram of a method for making a stowable support apparatus.

Also disclosed, and with reference to FIG. 3, is a method 200 for making a stowable support apparatus. The method 200 includes a step 201 of providing a first bi-stable member 110. The method also includes a step 202 of providing a second bi-stable member 120. The first bi-stable member 110 and second bi-stable member 120 provided in the providing steps 201 and 202 are as described above. In particular, each is alternatable between a stable, extended conformation having longitudinal linearity and lateral curvature, and a stable, coiled conformation having longitudinal curvature and lateral linearity. In addition, the first bi-stable member 110 provided in step 201 and the second bi-stable member 120 provided in step 202 will generally have opposing lateral curvature relationship relative to one another, as defined above.

The method 200 also includes a step 203 of joining the first and second bi-stable members with at least one structural alignment member 130. The structural alignment member 130 which is employed in the joining step 203 is as described above with reference to the stowable support apparatus 100. Thus, the structural alignment member 130 as employed in the method 200 is configured to direct the stowable support apparatus 100 into a load bearing conformation when the first and second bi-stable members 110, 120 are present in the extended conformation. Likewise, non-limiting examples of a structural alignment member 130 suitable for use in the method 200 include various forms of flexible fastener and/or flexible encapsulator 130*b*, as discussed above.

The method 200 can additionally include a step of intercoiling the first and second bi-stable members 110, 120. The intercoiling step can either precede or follow the joining step. For example, if the structural alignment member 130 is a flexible encapsulator 130*b*, such as a sleeve-shaped fabric, the flexible encapsulator 130*b* sleeve can be slid over the first and second-bi-stable members 110, 120 while they are in the extended conformation and they can then subsequently be intercoiled. Such an approach can result in the co-coiling of the flexible encapsulator 130*b* with the first and second bi-stable members 110, 120 as mentioned above.

In an example in which the intercoiling step can precede the joining step 203, the first and second bi-stable members can be intercoiled and one or more flexible structural alignment members 130 of the flexible fastener type can subsequently be affixed to adjacent lateral edges of the first and second bi-stable members 110, 120.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A stowable support apparatus, comprising:
   a first bi-stable member, the first bi-stable member being alternatable between a stable, extended conformation having longitudinal linearity and lateral curvature, and a stable, coiled conformation having longitudinal curvature and lateral linearity; an extended portion of the first bi-stable member having a concave surface facing in a direction of a coiled portion of the first bi-stable member and a convex surface facing away from the direction of the coiled portion when the first bi-stable member is in a partly extended and partly coiled conformation;
   a second bi-stable member, the second bi-stable member being alternatable between a stable, extended conformation having longitudinal linearity and lateral curvature, and a stable, coiled conformation having longitudinal curvature and lateral linearity; the second bi-stable member comprising first and second layers, at least one of the first and second layers comprising an auxetic material; the first and second layers configured such that an extended portion of the second bi-stable member has a convex surface facing in a direction of a coiled portion of the second bi-stable member and a concave surface facing away from the direction of the coiled portion when the second bi-stable member is in a partly extended and partly coiled conformation; and
   at least one flexible fastener, separate from the first and second bi-stable members, affixed to adjacent lateral edges of the first and second bi-stable members in both the extended conformation and the coiled conformation.

2. The stowable support apparatus of claim 1, wherein the at least one flexible fastener is configured to guide the first and second bi-stable members into proper alignment relative to one another for load support upon extension.

3. The stowable support apparatus of claim 1, wherein the at least one flexible fastener comprises at least one of a hinge and a flexible membrane.

4. The stowable support apparatus of claim 1, wherein the first and second bi-stable members alternate between the extended and coiled conformation in tandem, and are intercoiled when in the coiled conformation.

5. The stowable support apparatus of claim 1, wherein the first and second bi-stable members each respectively define continuous, linearly extending, longitudinal edges that are aligned and adjacent with one another in the extended conformation.

6. A method for making a stowable support apparatus, the method comprising:
providing a first bi-stable member, the first bi-stable member being alternatable between a stable, extended conformation having longitudinal linearity and lateral curvature, and a stable, coiled conformation having longitudinal curvature and lateral linearity;
providing a second bi-stable member, the second bi-stable member being alternatable between a stable, extended conformation having longitudinal linearity and lateral curvature, and a stable, coiled conformation having longitudinal curvature and lateral linearity;
joining the first and second bi-stable members with at least one structural alignment member configured to join the first and second bi-stable members when they are in either the extended conformation or the coiled conformation,
wherein the first bi-stable member and the second bi-stable member have an opposing lateral curvature relationship relative to one another; wherein an extended portion of the first bi-stable member has a concave surface facing in a direction of a coiled portion of the first bi-stable member and a convex surface facing away from the direction of the coiled portion when the first bi-stable member is in a partly extended and partly coiled conformation; and wherein an extended portion of the second bi-stable member has a convex surface facing in a direction of a coiled portion of the second bi-stable member and a concave surface facing away from the direction of the coiled portion when the second bi-stable member is in a partly extended and partly coiled conformation; and wherein the apparatus is configured such that, when the first and second bi-stable members are in an extended conformation, convex surfaces of the first and second bi-stable members contact one another.

7. The method of claim 6, wherein providing the first bi-stable member is further characterized in that the first bi-stable member comprises an auxetic material, or providing the second bi-stable member is further characterized in that the second bi-stable member comprises an auxetic material.

8. The method of claim 6, wherein the structural alignment member comprises a flexible encapsulator, and the joining step comprises engaging the flexible encapsulator about the first and second bi-stable members while the first and second bi-stable members are in the extended conformation.

9. The method of claim 6, further including a step of intercoiling the first and second bi-stable members.

10. The method of claim 6, wherein the structural alignment member comprises a flexible fastener, and the joining step comprises affixing the flexible fastener to adjacent lateral edges of the first and second bi-stable members while the first and second bi-stable members are in either of the extended conformation or the coiled conformation.

11. A stowable support apparatus, comprising:
a first bi-stable member, the first bi-stable member being alternatable between a stable, extended conformation having longitudinal linearity and lateral curvature, and a stable, coiled conformation having longitudinal curvature and lateral linearity;
a second bi-stable member, the second bi-stable member being alternatable between a stable, extended conformation having longitudinal linearity and lateral curvature, and a stable, coiled conformation having longitudinal curvature and lateral linearity; and
at least one flexible encapsulator surrounding or encapsulating at least a portion of the first and second bi-stable members in both the extended conformation and the coiled conformation,
wherein the first bi-stable member and the second bi-stable member have an opposing lateral curvature relationship relative to one another; wherein an extended portion of the first bi-stable member has a concave surface facing in a direction of a coiled portion of the first bi-stable member and a convex surface facing away from the direction of the coiled portion when the first bi-stable member is in a partly extended and partly coiled conformation; and wherein an extended portion of the second bi-stable member has a convex surface facing in a direction of a coiled portion of the second bi-stable member and a concave surface facing away from the direction of the coiled portion when the second bi-stable member is in a partly extended and partly coiled conformation; and wherein the apparatus is configured so that, when each of the first and second bi-stable members is in the extended conformation, convex surfaces of the first and second bi-stable members contact one another.

12. The stowable support apparatus of claim 11, wherein the flexible encapsulator directs the apparatus into a load bearing conformation when the first and second bi-stable members are present in the extended conformation.

13. The stowable support apparatus of claim 11, wherein either of the first and second bi-stable members comprises an auxetic material.

14. The stowable support apparatus of claim 11, wherein the first and second bi-stable members alternate between the extended and coiled conformation in tandem, and are intercoiled when in the coiled conformation.

15. The stowable support apparatus of claim 14, wherein the flexible encapsulator is co-coiled with the first and second bi-stable members when the first and second bi-stable members are present in the coiled conformation.

* * * * *